Oct. 31, 1967 H. W. AVERY 3,350,008

FLUID AMPLIFIER SHIFT REGISTER CIRCUIT

Filed March 28, 1966

Inventor:
Howard W. Avery,
by Louis A. Moucha

United States Patent Office 3,350,008
Patented Oct. 31, 1967

3,350,008

FLUID AMPLIFIER SHIFT REGISTER CIRCUIT

Howard W. Avery, Schenectady, N.Y., assignor to General Electric Company, a corporation of New York Filed Mar. 28, 1966, Ser. No. 537,888
7 Claims. (Cl. 235—201)

ABSTRACT OF THE DISCLOSURE

A serially-operated fluidic shift register circuit for providing information storage and shift functions for binary coded fluid signals. The shift register comprises a plurality of searially connected stages, each stage including two nonmemory-type digital fluid amplifiers acting as gates to provide the shift function and a third memory-type digital fluid amplifier to provide the storage function. The digital number representing information is supplied in serial form to the first stage gate elements, and upon application of synchronizing clock pulses to all the gate elements each binary bit is successively shifted to the next stage.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

My invention relates to a fluid-operated shift register circuit of the type employed to store data in digital computation and control systems, and in particular to such shift register employing devices known as fluid amplifiers having no mechanical moving parts.

Fluid-operated logic circuits, including the shift register, employing the recently developed no-moving parts devices known as fluid amplifiers have many advantages over the analogues electronic circuits. In particular,. the fluid amplifier is relatively simple in design, inexpensive in fabrication, capable of withstanding extreme environmental conditions such as shock, vibration, nuclear radiation and high temperature, and the no-moving parts feature permits substantially unlimited lifetime thereby achieving long periods of uninterrupted operation. This latter feature is of special significance in the computation and control systems field where trouble-free elements are necessary to achieve such desired uninterrupted operation.

Computation and control systems may employ digital computation, analog computation or combinations thereof. The use of digital computation has several advantages over analog computation including accuracy, application flexibility, and greater tolerance of undesirable ratios of noise to signals. Thus, practically any desired accuracy can be obtained by increasing the number of bits in a number which is expressed in binary logic digital form. Digital computations may be either serial or parallel in operation, depending upon the method of handling the binary bits. Serial operation, although slower since it is performed one bit at a time, requires fewer logic elements since the same elements are used for all the bits whereas in parallel operation a separate set of elements is used for each bit. One of the most basic circuits employed in digital computation is a shift register which stores data in binary bit digital form. Known fluid-operated shift registers employing fluid amplifiers are relatively slow in operation and thereby reduce the speed of digital computation.

Therefore, one of the principal objects of my invention is to provide a fluid-operated shift register circuit.

Another object of my invention is to construct the shift register from elements having no mechanical moving parts and known as fluid amplifiers.

A still further object of my invention is to construct the shift register from particular fluid amplifier elements which permit fast operation of the shift register information storage and shifting functions.

Briefly stated, my invention is a new fluid-operated shift register circuit providing information storage and shift functions for pressurized fluid signals which represent digital numbers in binary bit form. The shift register is comprised of a plurality of serially connected stages, the particular plurality determining the bit capacity of the shift register. Each stage includes a pair of active (non-memory type) digital-type fluid amplifier elements acting as gates to provide the "shift" function, and a third active (memory type) digital-type fluid amplifier element interconnected therewith, acting as a flip-flop to provide the "storage" function. Pressurized fluid pulses representing digital information in binary bit form are supplied from an appropriate fluid-operated logic source in serial form to first control fluid inlets of the first stage fluid amplifier gate elements. In each stage except the last, the two outputs of the storage element therein are connected to the first control fluid inlets of the two gate elements in the next successive stage to obtain the arrangement of serially connected stages. Thus, the information binary bit stored in each stage is also the signal input to the gate elements in the next successive stage. Second control fluid inlets of all the gate elements are supplied from a source of periodic clock (shift) pressurized fluid pulses for synchronizing the operation of the shift function throughout the shift register. In the absence of a clock pulse, the second control fluid inlets of all gate elements are supplied with a reduced pressure to bias such elements in a direction to cause the outputs thereof to vent to the atmosphere regardless of any signal input to the first control fluid inlets thereof. Upon application of a clock pulse, the information binary bit stored in each stage is passed (shifted) through a particular gate element in the next successive stage to the storage element therein. Thus, a binary "ONE" is shifted through a first of the two gate elements in a stage and supplied to a first control fluid inlet of the associated flip-flop storage element therein upon application of a clock pulse whereas a binary "ZERO" is shifted through a second of the gate elements and supplied to a second control fluid inlet of the storage element upon application of another clock pulse. The time interval to accomplish the successive storage and shift of the information binary bit signals comprising a digital number through the serially connected stages of the shift register is equal to the number of clock pulses corresponding to the number of shift register stages.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

Figures 1, 2:
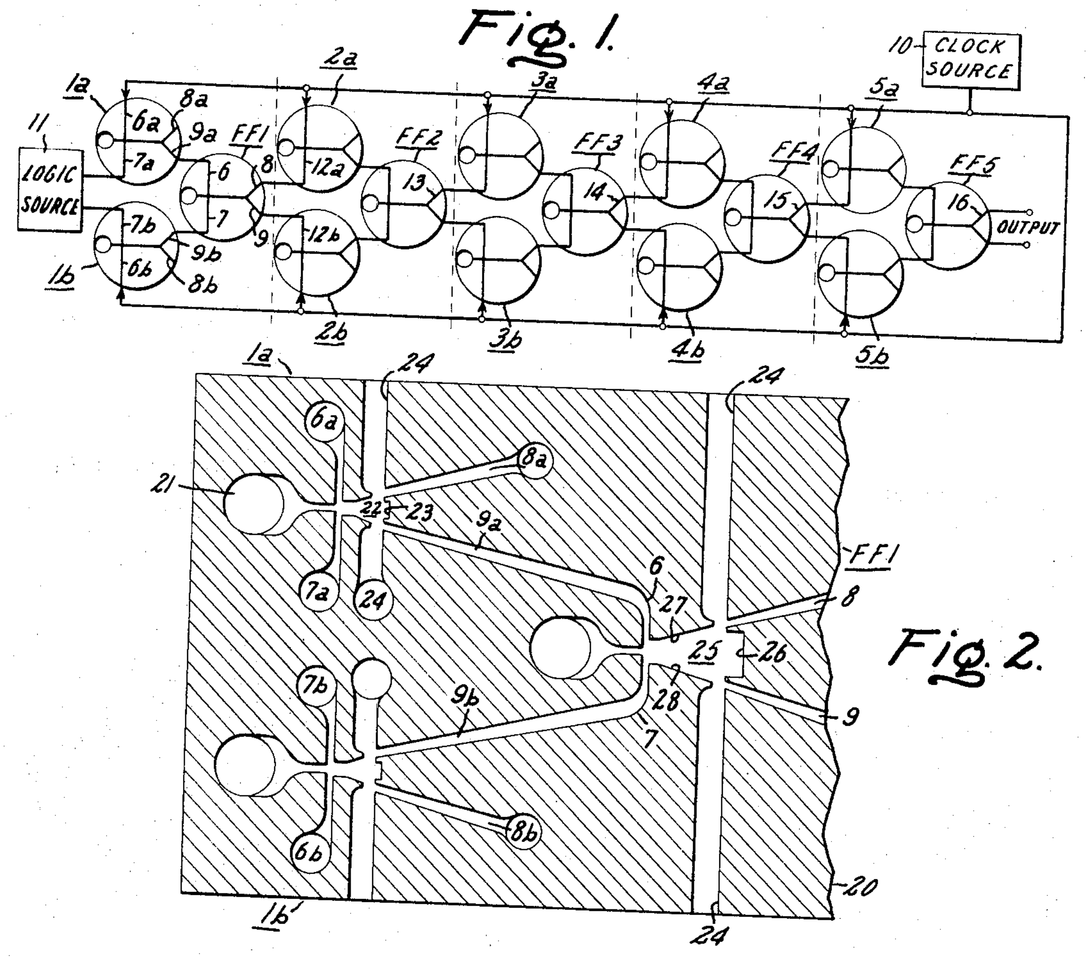
FIGURE 1 is a schematic diagram of a fluid amplifier shift register circuit constructed in accordance with my invention.
FIGURE 2 is a diagrammatic view in top plan of a single stage of the shift register.

Referring now to the drawings, in FIGURE 1 there is shown a schematic diagram of a fluid-operated shift register circuit comprised of five serially connected stages constructed in accordance with my invention. The dashed lines indicate the separation between adjacent stages of the shift register. Each of the large circles outlines the schematic representation of a particular digital-type fluid amplifier element. The straight (nondashed) lines external of the large circles illustrate suitable fluid conveying means. The fluid amplifier elements employed in my circuit are each of the active type, that is, having a pressurized supply of power fluid as represented by the smaller circle within each of the larger ones. The active type element, as opposed to the passive type which has no power fluid supply, in general provides fluid amplification and thus does not require additional amplification of the output signal thereof as in the case of passive type elements.

Each stage of my shift register employs a pair of digital-type fluid amplifier elements of the nonmemory type acting as gates to provide the "shift" function, and a third element of the memory type acting as a flip-flop to provide the information "storage" function. Thus, the first stage includes a pair of elements herein designated as "digital amplifiers" 1a and 1b interconnected with a flip-flop element FF1. A detailed description of these two types of elements with particular emphasis on the flip-flop is provided as to FIGURE 3 in U.S. Patent No. 3,232,533 to W. A. Boothe, and assigned to the same assignee as the present invention. A further description of the construction of the digital amplifier and flip-flop will be provided hereinafter in the explanation of FIGURE 2 but it will suffice herein to describe the elements and their interconnection as follows: The digital amplifier (gating) and flip-flop elements each include a power fluid inlet for forming a pressurized continuous power fluid jet, and a pair of opposed control fluid inlets indicated schematically in FIGURE 1 as straight line segments 6 and 7 for forming pressurized intermittent control fluid jets directed against opposite sides of the power jet. The digital amplifiers have no memory capability and require some input (control fluid) signal to provide a directionally stable output. The control fluid inlets 6a, 6b of the digital amplifiers are supplied from a source 10 of periodic clock (shift) pressurized fluid pulses. In the absence of these timing pulses, a reduced (subambient) pressure is supplied from source 10 to bias the digital amplifiers and cause the outputs thereof (derived from the power fluid flow) to remain vented to the atmosphere regardless of any information input signals supplied to the control fluid inlets 7a and 7b. The vented output fluid passage (receiver) of each of the digital amplifiers is designated as the short leg 8a and 8b of the Y within each of the large circular schematic symbols. Second output passages of the digital amplifiers are connected to associated control fluid inlets of the flip-flop element. The nonvented output (receivers) 9a and 9b are connected to control fluid inlets 6 and 7, respectively, of flip-flop FF1. The two outputs of flip-flop FF1 are connected to the two signal input control fluid inlets 12a and 12b of the second stage digital amplifiers 2a and 2b. The second and subsequent stages are interconnected in the same manner as the first stage, the output of the shift register being provided at the output of the flip-flop element FF5 in the last stage of the five stage array.

Figure 3:
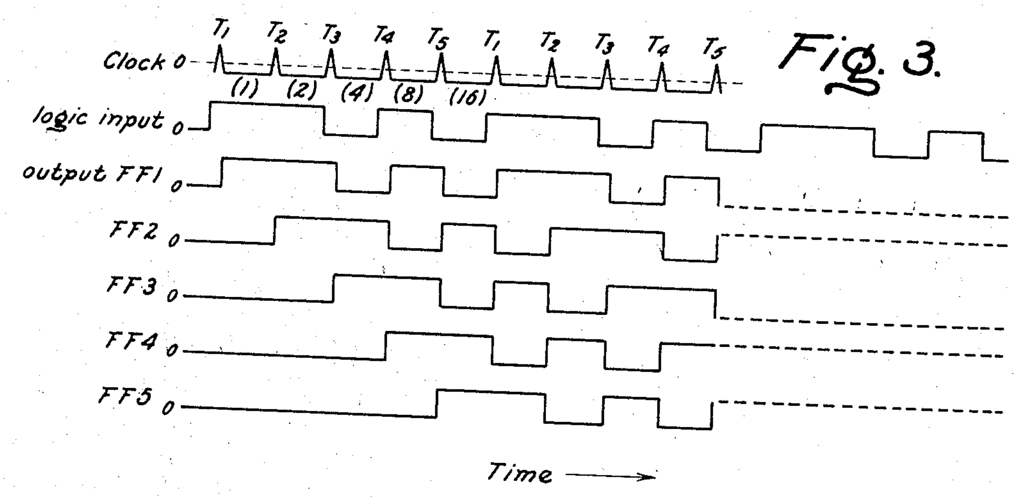
FIGURE 3 is a timing diagram of various waveforms useful in explaining the operation of my shift register.

The operation of my shift register will now be described with reference to the schematic diagram of FIGURE 1 and the timing diagram of FIGURE 3. The signal input to the shift register is supplied from a logic source 11 which provides information or data as digital numbers in pressurized fluid binary bit form. The logic source may comprise a fluid amplifier logic circuit such as the serial digital adder circuit described and claimed in a concurrently filed U.S. patent application S.N. 537,907, Robert K. Rose, inventor, entitled "Fluid Amplifier Serial Digital Adder Logic Circuit," and assigned to the assignee of the present invention. The fluid signal output from the logic source 11 is designated in FIGURE 3 as "logic input." The "logic input" signal is a pressurized fluid pulse train of substantially square wave form, the high pressure state representing a binary "ONE" and the low (ambient) pressure state representing a binary "ZERO." For illustrative purposes, the logic input signal in FIGURE 3 is the periodic number 26 represented in binary logic bit form as a periodic 5-bit word 11010. It is assumed that initially (prior to clock pulse $T_1$) the register is cleared, i.e., set to 00000. Thus, prior to the first clock pulse $T_1$, the low pressure state (binary ZERO) exists at the corresponding receivers 8, 13, 14, 15 and 16, of information storage elements FF1, FF2, FF3, FF4 and FF5, respectively, and the high presseure state at the other receivers thereof. The logic input signal illustrated in FIGURE 3 is supplied to the control fluid inlet 7a of a gate element 1a, and the corresponding "not" logic input signal is supplied to control fluid inlet 7b of gate element 1b. It should also be observed that during this interval prior to clock pulse $T_1$, the gate elements in each of the stages are biased such that the outputs thereof are vented to the atmosphere regardless of any logic input control fluid signal. Upon application of the first ONE bit logic input signal to control fluid inlet 7a of gate element 1a in the first stage and the concurrent application of clock pulse $T_1$, the (power fluid) output of gate element 1a remains directed to the vented output 8a thereof; the corresponding "not" ZERO bit logic input signal to control fluid inlet 7b of gate element 1b causes the output thereof to be momentarily directed to nonvented receiver 9b and to control fluid inlet 7 of storage element FF1, thereby switching the (power fluid) output thereof to receiver 8. The operation of each pair of gate elements in each stage is in the hereinabove described push-pull mode, and to insure such operation the amplitude of the binary ONE logic input signals applied to the gates must be greater than the amplitude of the clock pulses. Thus, it can be seen from FIGURE 3 that the first logic input signal (a binary ONE bit) is shifted (transferred) to the output 8 of the first stage of the shift register and stored thereat (FF1 output) a very short time interval after clock pulse $T_1$. The second through fifth stages of the shift register remain in their zero output states since the FF1 output, which is applied to the second stage gate element 2a, is not attained until after gate element 2a has reassumed its biased state at the termination of clock pulse $T_1$.

Upon concurrent application of the second clock pulse $T_2$, and the second logic input signal (a binary ONE) the first stage undergoes the same sequence of events as described hereinabove at the time of clock pulse $T_1$. Since the storage elements have a memory capability, the output 8 of element FF1 remains in a binary ONE state in response to clock pulse $T_2$. During the interval of clock pulse $T_2$, the signal input to control fluid inlet 12a of gate element 2a (the binary ONE state of element FF1) causes the output thereof to be directed to the vented receiver; the "not" output at the nonvented receiver of gate element 2b causes the output of the second stage storage element FF2 to switch to receiver 13 in the same manner as described previously with reference to element FF1 in the first stage.

Upon concurrent application of the third clock pulse $T_3$ and the third binary bit of the logic input signal (a binary ZERO) to the first stage gate element 1a, the output thereof is directed to nonvented receiver 9a. In like manner, the concurrent application of clock pulse $T_3$ and the "not" logic input signal (a binary ONE) to gate element 1b causes the output thereof to be directed to the vented receiver 8b. The presence of an output at receiver 9a and absence at receiver 9b causes storage element FF1 to switch its output to receiver 9 and thus the binary ZERO logic input is shifted to the output 8 of the first stage and stored thereat. In like manner, the prior binary ONE states at the outputs of the first and second stages are shifted to the outputs 13, 14 of the second and third stages, respectively. It is thus evident that the logic input signal is shifted (and stored) through the shift register one binary bit at a time in response to each clock pulse. In the illustrated example of a five bit word, five successive clock pulses are required to store the complete number 11010 in the shift register such that the least significant bit is contained in the first stage FF1 and the most significant bit in the fifth stage FF5. In addition, for the particular example of a periodic five bit number and five stage shift register, if the clock pulses are omitted after any integral multiple of five clock pulses, the states of the respective five storage element flip-flops indicate the logic input number.

One stage of my shift register is illustrated in top plan view in FIGURE 2 and for exemplary purposes it is the first stage of the FIGURE 1 circuit. The single stage has utility as exemplified in the hereinabove mentioned concurrently filed U.S. patent application S.N. 537,907, wherein the single stage is employed as a one-bit storage in a one-bit carry circuit. A detailed description of the material forming the fluid amplifier base member 20 and methods of forming the appropriate fluid passages therein is provided in the hereinabove referenced U.S. Patent No. 3,232,533. Digital amplifier 1*a* is comprised of a power fluid (inlet) passage 21 terminating in a restrictor for forming a pressurized power fluid jet directed in a path toward interaction chamber 22. During operation of the shift register, the power fluid passage is continuously supplied with a pressurized power fluid from an appropri-control fluid passages terminating in oppositely disposed ate source thereof. Control fluid inlets *6a* and *7a* comprise control fluid passages terminating in oppositely disposed restrictors for forming pressurized control fluid jets directed against opposite sides of the power jet. In my particular application, the control fluid passages are supplied with pressurized (logic input to the first stage) control fluid signals to form control fluid jets directed intermittently against a first side of the power jet and during the remaining intervals being directed against the opposite side thereof. The control jets deflect the power jet within the interaction chamber 22, the latter being defined by a pair of oppositely disposed side walls which diverge in the direction of the power jet fluid flow. The side walls of the digital amplifier are sufficiently short to obtain momentum exchange action within the interaction chamber and thus the power jet is not stable in the absence of any control fluid input and has no memory capability. Although the digital amplifier is not of the boundary layer effect type, it is a digital-type fluid control device in that it provides a mutually exclusive pressurized fluid output having a substantially square waveform in response to a selected one of the control fluid inlets being supplied with a pressurized control fluid. Indentation 23 provided intermediate the first and second output passages *8a, 9a,* imparts a vortex action to the power jet to enhance the deflection thereof and to compact the fluid therein to aid in creating the substantially mutually exclusive flows of power fluid in the receivers *8a* and *9a* downstream of the power fluid inlet. Vent passages 24 serve to remove excess fluid from the region of deflection of the power jet. The fluid interconnections between digital amplifiers 1*a* and 1*b* and flip-flop element FF1 are illustrated as being formed within the same base member 20 to thereby minimize the number of external fluid couplings and external connections. Alternatively, the fluid amplifier elements may be formed in separate base members and then assembled in a stacked arrangement to form a compact modular structure.

Flip-flop information storage element FF1 is a digital fluid control device similar to the digital amplifiers 1*a* and 1*b* with the exception that the flip-flop is bistable in operation and has a memory capability. The bistable feature and memory capability is obtained from the use of longer side walls which define the interaction chamber 25 and a deeper indentation 26. The longer side walls obtain the boundary layer effect action whereby the power jet becomes attached to one or the other, but not both, of the side walls 27 and 28 and remains so attached until switched to the other side wall by an opposed control fluid jet. Vents 24 of the flip-flop element serve the same functions as the corresponding vents in the digital amplifiers.

The clock source 10 which generates periodic pressurized fluid pulses and a sub-ambient pressure between pulses may comprise any one of a number of conventional devices. As one example, the desired waveform is obtained by stagnating an aspirator. An aspirator is a device comprising an enclosed chamber having three fluid passages. Two of the passages terminate in an aligned nozzle and receiver directed toward each other within the chamber, the nozzle being supplied from a source of constant pressurized fluid to produce a steady state fluid jet directed into the chamber. The receiver (the exhaust tube) is supplied from a source of periodically flowing fluid to produce periodic fluid pulses at the clock pulse frequency. During the intervals between the periodic pulses, the steady state jet is directed against the exhaust tube and causes a subambient pressure within the third fluid passage (the suction leg) which is the output of the clock source 10. During the intervals of the periodic pulses, the fluid in the receiver becomes stagnated and is exhausted through the suction leg in the form of the desired clock pulses at a pressure level less than that of the binary "ONE" signals supplied by logic source 10 or the various flip-flop elements. The frequency of the clock pulses divided by the number of bits in a word (number) is equal to the number of word shifts that are performed in one second by my shift register. Thus, employing the illustrated example in FIGURE 3 of five bit words and a clock frequency of 240 cycles per second, 48 word shifts per second are performed. A clock frequency of 1,000 cycles per second is considered to be a relatively fast operating speed for my shift register, but is not to be construed as a limitation of the speed thereof. It should be apparent that the bit capacity of the shift register may be made greater or smaller by correspondingly increasing or decreasing the number of serially connected stages, the greater the bit capacity the slower the word shift frequency at the same clock pulse frequency.

It is apparent from the foregoing that my invention attains the objectives set forth. In particular, my invention provides a fluid-operated shift register circuit which is constructed from the elements known as fluid amplifiers having no mechanical moving parts. The shift register is comprised of a plurality of serially connected stages wherein each stage employs three interconnected digital-type fluid amplifier elements. Two of the three fluid amplifiers in each stage are digital amplifiers functioning as gating elements to provide the "shift" function and the third fluid amplifier is a flip-flop providing the "storage" function. Since these fluid amplifier elements, in general, provide amplification of the fluid signal, no additional intermediate stages of fluid amplification are required as in the prior art and thus a faster operation of the shift register is obtained. In addition, my shift register does not require fluid reactive components such as fluid capacitances and resistances employed in some prior art shift registers which further decrease the operating speed of a shift register. The serial arrangement of the stages and the corresponding serial operation of my shift register has the further advantage that the register may be employed in systems wherein the information is available in serial form and thus no additional serial-to-parallel and parallel-to-serial converters are required with my circuit. Finally, the use of an external bias (sub-ambient pressure) for the gate elements permits satisfactory operation of the shift register under varied conditions such as when the clock pulses have different amplitudes.

Having described a new fluid-operated shift register circuit it is believed abvious that modification of my invention is possible in light of the above teachings. Thus, my shift register can be reset to zero, or any other number, as desired, by supplying appropriate pressurized fluid signals to the junctions of each gating element output and flip-flop control fluid inlet. It is, therefore, to be understood that modifications may be made in the particular embodiment of my invention described which are within the full intended scope of the invention as defined by the following claims.

What I claim as new and desire to secure by Letters Patent of the United States is:

1. In a fluid-operated shift register circuit for shifting and storing information in pressurized fluid form and comprising a plurality of serially connected stages,
each stage comprising
fluid amplifier gating means having vented and nonvented power fluid receivers,
means for supplying periodic pressurized fluid timing pulses to said gating means for initiating each periodic shift operation thereof, said timing pulse means further provided with sub-ambient pressure means for biasing said gating means between timing pulses to cause power fluid flows therein to be directed to the vented receivers regardless of any information signal applied to said gating means,
said gating means each provided with a pair of control fluid inlets positioned intermediate a power fluid inlet and said receivers, a first of said pair of control fluid inlets in fluid communication with said timing pulse and biasing means, a second of said pair of control fluid inlets supplied with pressurized fluid pulses representing digital information in binary bit from which is shifted through the shift register one bit at a time in response to each successive timing pulse, said gating means being unstable in the absence of any timing pulses, bias and information pulses applied to said pair of control fluid inlets, and
fluid amplifier flip-flop means in fluid communication with said gating means for storing the information pulses between successive timing pulses.

2. The fluid-operated shift register circuit set forth in claim 1 wherein
said gating means in each stage comprise a pair of digital-type fluid amplifier devices of the momentum exchange type having no memory capability, and
said flip-flop means in each stage comprises a digital-type fluid amplifier device of the boundary layer effect type having a memory capability.

3. The fluid-operated shift register circuit set forth in claim 1 wherein
said flip-flop means comprises
a power fluid inlet,
a pair of output receivers downstream from the latter power fluid inlet, and
a pair of control fluid inlets positioned intermediate said latter power fluid inlet and said output receivers and at opposite sides of a power jet issuing from said latter power fluid inlet, said flip-flop means control fluid inlets connected in fluid communication with the nonvented receivers associated with said gating means in the same stage, said gating means second control fluid inlets connected in fluid communication with the output receivers associated with said flip-flop means in each immediately preceding stage.

4. The fluid-operated shift register circuit set forth in claim 3 wherein
said gating means and flip-flop means power fluid inlets are supplied from a source of continuously pressurized fluid.

5. A fluid-operated shift register circuit having a maximum binary logic bit capacity equal to the number of stages in the shift register, each stage comprising first and second digital-type fluid amplifier devices of the momentum exchange type, each said device comprising
a power fluid inlet for generating a power jet of pressurized fluid,
a pair of fluid receivers downstream from said power fluid inlet, and
a pair of control fluid inlets positioned intermediate said power fluid inlet and said receivers and and at opposite sides of the power jet for causing substantially mutually exclusive flow of the power jet into one or the other of said two receivers, a first of said control fluid inlets supplied from a source of periodic pressurized fluid timing pulses which initiate each periodic operation of the shift register, a second of said control fluid inlets supplied with pressurized fluid pulses representing digital information in binary bit form, said source of timing impulses supplying a sub-ambient pressure between timing pulses to thereby bias said momentum exchange type fluid amplifier devices to cause the power jets therof to be vented to the atmosphere regardless of any information pulses supplied to said second control fluid inlets thereof, said fluid amplifier devices providing a gating action to shift a pressurized fluid information pulse from the control fluid inlet to a receiver thereof upon simultaneous application of a timing pulse and the information pulse, said fluid amplifier devices being unstable in the absence of any timing and information pulses applied to said pair of control fluid inlets, and
a third digital-type fluid amplifier device of the boundary layer effect type, said third fluid amplifier device comprising
a power fluid inlet for generating a third power jet of pressurized fluid,
a pair of fluid receivers downstream from said latter power fluid inlet,
a pair of control fluid inlets positioned intermediate said latter power fluid inlet and the latter reecivers and at opposite sides of the third power jet for causing substantially exclusive flow of the third power jet into one or the other of said latter receivers,
means for interconnecting the control fluid inlets of said third fluid amplifier device with selected receivers of said momentum exchange type fluid amplifier devices whereby the information pulse upon being shifted to the output receivers of the momentum exchange type devices is thence stored in said third device, and
the pair of receivers of the third digital-type fluid amplifier in each stage except the last being connected to said second control fluid inlets of the first and second digital-type fluid amplifiers of the immediately succeeding stage to obtain a serially connected shift register circuit.

6. The fluid-operated shift register circuit set forth in claim 5 wherein
the first and second of the fluid receivers of said first momentum exchange type device are respectively in fluid communication with a first of the control fluid inlets of said boundary layer effect type device and vented to the atmosphere, and
the first and second of the fluid receivers of said second momentum exchange type device are respectively in fluid communication with a second of the control fluid inlets of said boundary layer effect type device and vented to the atmosphere.

7. The fluid-operated shift register circuit set forth in claim 5 wherein
said first and second momentum exchange type fluid amplifiers are operable in a push-pull mode whereby binary logic "ONE" and "ZERO" bit information pulses are supplied to the second control fluid inlet of said first momentum exchange type fluid amplifier, and corresponding binary "not" logic "ZERO" and "ONE" bit information pulses are supplied to the second control fluid inlet of said second momentum exchange type fluid amplifier, and the pressurized amplitude of the "ONE" bit information pulses being greater than the amplitude of the timing pulses.

References Cited

UNITED STATES PATENTS

| | | | |
|---|---|---|---|
| 3,034,628 | 5/1962 | Wadey | 235—201 |
| 3,128,039 | 4/1964 | Norwood | 235—201 |
| 3,190,554 | 6/1965 | Gehring et al. | 235—201 |
| 3,248,053 | 4/1966 | Phillips | 235—201 |

RICHARD B. WILKINSON, *Primary Examiner.*

L. R. FRANKLIN, *Assistant Examiner.*

UNITED STATES PATENT OFFICE

CERTIFICATE OF CORRECTION

Patent No. 3,350,008 October 31, 1967

Howard W. Avery

It is hereby certified that error appears in the above numbered patent requiring correction and that the said Letters Patent should read as corrected below.

Column 7, line 30, for "from" read -- form --; column 8, line 43, for "reecivers" read -- receivers --.

Signed and sealed this 19th day of November 1968.

(SEAL)
Attest:

Edward M. Fletcher, Jr.
Attesting Officer

EDWARD J. BRENNER
Commissioner of Patents